United States Patent

Merchant et al.

[11] Patent Number: 5,759,986
[45] Date of Patent: Jun. 2, 1998

[54] DECAFLUOROPENTANE COMPOSITIONS

[76] Inventors: Abid Nazarali Merchant, 1408 Clive Cir., Wilmington, Del. 19803; Barbara Haviland Minor, 233 Green Haven Dr., Elkton, Md. 21921; Shoeb Akberali Moiyadi, 47 Kings Grant Rd., Hockessin, Del. 19707

[21] Appl. No.: 831,171

[22] Filed: Apr. 2, 1997

Related U.S. Application Data

[63] Continuation-in-part of Ser. No. 808,767, Mar. 3, 1997.

[51] Int. Cl.$^6$ ............... C23G 5/028; C08K 5/04; C11D 7/30
[52] U.S. Cl. ............... 510/415; 134/10; 134/31; 521/88; 521/98; 521/117; 521/131
[58] Field of Search ............... 510/415; 134/10, 134/31; 521/88, 98, 117, 131

[56] References Cited

U.S. PATENT DOCUMENTS

| | | | |
|---|---|---|---|
| 5,064,559 | 11/1991 | Merchant et al. | 252/171 |
| 5,064,560 | 11/1991 | Merchant | 252/171 |
| 5,196,137 | 3/1993 | Merchant | 252/172 |
| 5,578,134 | 11/1996 | Lentsch et al. | 134/3 |

FOREIGN PATENT DOCUMENTS 07113098  5/1995  Japan.

Primary Examiner—Morton Foelak

[57] ABSTRACT

Azeotropic or azeotrope-like compositions of effective amounts of 1,1,1,2,3,4,4,5,5,5-decafluoropentane, trans-1,2-dichloroethylene, cyclopentane and methanol or 1,1,1,2,3,4,4,5,5,5-decafluoropentane, trans-1,2-dichloroethylene and cyclopentane to form an azeotropic or azeotrope-like composition are disclosed that are useful as cleaning agents, refrigerants, aerosol propellants, heat transfer media, gaseous dielectrics, fire extinguishing agents, expansion agents for polyolefins and polyurethanes and as power cycle working fluids.

4 Claims, No Drawings

DECAFLUOROPENTANE COMPOSITIONS

CROSS-REFERENCE TO RELATED APPLICATION

This application is a Continuation-in-Part of Ser. No. 08/808,767 filed Mar. 3, 1997, pending and entitled "Decafluoropentane Compositions", which claims the benefit of U.S. Provisional Application No. 60/016,481 filed Apr. 29, 1996.

FIELD OF THE INVENTION

This invention relates to compositions, or mixtures, of fluorinated hydrocarbons and more specifically to azeotropic or azeotrope-like compositions comprising effective amounts of 1,1,1,2,3,4,4,5,5,5-decafluoropentane, trans-1,2-dichloroethylene, cyclopentane and methanol or 1,1,1,2,3,4,4,5,5,5-decafluoropentane, trans-1,2-dichloroethylene and cyclopentane to form an azeotropic or azeotrope-like composition. Such compositions are useful as cleaning agents, expansion agents for polyolefins and polyurethanes, refrigerants, aerosol propellants, heat transfer media, gaseous dielectrics, fire extinguishing agents, power cycle working fluids, polymerization media, particulate removal fluids, carrier fluids, buffing abrasive agents, and displacement drying agents.

BACKGROUND OF THE INVENTION

Fluorinated hydrocarbons have many uses, one of which is as a cleaning agent or solvent to clean, for example, electronic circuit boards. Electronic components are soldered to circuit boards by coating the entire circuit side of the board with flux and thereafter passing the flux-coated board over preheaters and through molten solder. The flux cleans the conductive metal parts and promotes solder fusion, but leave residues on the circuit boards that must be removed with a cleaning agent. Fluorinated hydrocarbons are also useful cleaning agents in vapor degreasing operations.

Preferably, cleaning agents should have a low boiling point, nonflammability, low toxicity, and high solvency power so that flux and flux-residues can be removed without damaging the substrate being cleaned. Further, it is desirable that cleaning agents that include a fluorinated hydrocarbon be azeotropic or azeotrope-like so that they do not tend to fractionate upon boiling or evaporation. If the cleaning agent were not azeotropic or azeotrope-like, the more volatile components of the cleaning agent would preferentially evaporate, and the cleaning agent could become flammable or could have less-desirable solvency properties, such as lower rosin flux solvency and lower inertness toward the electrical components being cleaned. The azeotropic property is also desirable in vapor degreasing operations because the cleaning agent is generally redistilled and reused for final rinse cleaning.

Fluorinated hydrocarbons may also be used as refrigerants. In refrigeration applications, a refrigerant is often lost during operation through leaks in shaft seals, hose connections, solder joints, and broken lines. In addition, the refrigerant may be released to the atmosphere during maintenance procedures on refrigeration equipment. Accordingly, it is desirable to use a single fluorinated hydrocarbon or an azeotropic or azeotrope-like composition that includes one or more fluorinated hydrocarbons as a refrigerant. Some nonazeotropic compositions that include one or more fluorinated hydrocarbons may also be used as refrigerants, but they have the disadvantage of changing composition, or fractionating, when a portion of the refrigerant charge is leaked or discharged to the atmosphere. If a non-azeotropic composition contains a flammable component, the blend could become flammable because of such a change in composition. Refrigerant equipment operation could also be adversely affected due to the change in composition and vapor pressure that results from fractionation.

Azeotropic or azeotrope-like compositions of fluorinated hydrocarbons are also useful as blowing agents in the manufacture of close-cell polyurethane, phenolic and thermoplastic foams. Insulating foams require blowing agents not only to foam the polymer, but more importantly to utilize the low vapor thermal conductivity of the blowing agents, which is an important characteristic for insulation value.

Aerosol products employ both single component fluorinate hydrocarbons and azeotropic or azeotrope-like compositions of fluorinated hydrocarbons as propellant vapor pressure attenuators in aerosol systems.

Azeotropic or azeotrope-like compositions, with their substantially constant compositions and vapor pressures, are useful as solvents and propellants in aerosols.

Azeotropic or azeotrope-like compositions that include fluorinated hydrocarbons are also useful as heat transfer media, gaseous dielectrics, fire extinguishing agents, power cycle working fluids such as for heat pumps, inert media for polymerization reactions, fluids for removing particulates from metal surfaces, and as carrier fluids that may be used, for example, to place a fine film of lubricant on metal parts.

Azeotropic or azeotrope-like compositions that include fluorinated hydrocarbons are further useful as buffing abrasive detergents to remove buffing abrasive compounds from polished surfaces such as metal, as displacement drying agents for removing water such as from jewelry or metal parts, as resist-developers in conventional circuit manufacturing techniques employing chlorine-type developing agents, and as strippers for photoresists when used with, for example, a chlorohydrocarbon such as 1,1,1-trichloroethane or trichloroethylene.

SUMMARY OF THE INVENTION

The present invention relates to the discovery of azeotropic or azeotrope-like compositions comprising admixtures of effective amounts of 1,1,1,2,3,4,4,5,5,5-decafluoropentane, trans-1,2-dichloroethylene, cyclopentane and methanol or 1,1,1,2,3,4,4,5,5,5-decafluoropentane, trans-1,2-dichloroethylene and cyclopentane to form an azeotropic or azeotrope-like composition.

DETAILED DESCRIPTION

The compositions of the instant invention are constant boiling, azeotropic or azeotrope-like compositions, or mixtures, comprising effective amounts of 1,1,1,2,3,4,4,5,5,5-decafluoropentane (HFC-43-10mee, $CF_3CHFCHFCF_2CF_3$, boiling point=54.6° C.), trans-1,2-dichloroethylene (trans-1,2-DCE, CHCl=CHCl, boiling point=48° C.), cyclopentane (cyclo-$(CH_2)_5$, boiling point =49° C.) and methanol ($CH_3OH$, boiling point =65° C.) to form an azeotropic or azeotrope-like composition.

Effective amounts of 1,1,1,2,3,4,4,5,5,5-decafluoropentane, trans-1,2-dichloroethylene, cyclopentane and methanol or 1,1,1,2,3,4,4,5,5,5-decafluoropentane, trans-1,2-dichloroethylene and cyclopentane to form an azeotropic or azeotrope-like composition, when defined in terms of weight percent of the components at a specific pressure or temperature, include the following.

Substantially constant-boiling, azeotropic or azeotrope-like compositions of HFC-43-10mee, trans-1,2-DCE, cyclopentane and methanol comprise about 40 to 70 weight percent HFC-43-10mee, about 15 to 50 weight percent trans-1,2-DCE, about 1 to 25 weight percent cyclopentane and about 1 to 10 weight percent methanol. These compositions boil at about 33.8°±1.2° C., at substantially atmospheric pressure. A preferred composition comprises about 45 to 65 weight percent HFC-43-10mee, about 20 to 30 weight percent trans-1,2-DCE, about 10 to 20 weight percent cyclopentane and about 2 to 8 weight percent methanol. A more preferred composition is the azeotrope, which comprises about 57.7 weight percent HFC-43-10mee, about 22.1 weight percent trans-1,2-DCE, about 16.0 weight percent cyclopentane and about 4.2 weight percent methanol, and which boils at about 33.8° C., at substantially atmospheric pressure.

Substantially constant-boiling, azeotropic or azeotrope-like compositions of HFC-43-10mee, trans-1,2-DCE and cyclopentane comprise about 35 to 75 weight percent HFC-43-10mee, about 10 to 50 weight percent trans-1,2-DCE and about 5 to 25 weight percent cyclopentane. These compositions boil at about 34° C., at substantially atmospheric pressure. A preferred composition comprises about 40 to 70 weight percent HFC-43-10mee, 15 to 45 weight percent trans-1,2-DCE and about 10 to 20 weight percent cyclopentane. A more preferred composition is the azeotrope, which comprises about 62.9 weight percent HFC-43-10mee, about 19.9 weight percent trans-1,2-DCE and about 17.2 weight percent cyclopentane, and which boils at about 34° C., at substantially atmospheric pressure.

For purposes of this invention, "effective amount" is defined as the amount of each component of the inventive compositions which, when combined, results in the formation of an azeotropic or azeotrope-like composition. This definition includes the amounts of each component, which amounts may vary depending on the pressure applied to the composition so long as the azeotropic or azeotrope-like compositions continue to exist at the different pressures, but with possible different boiling points.

Therefore, effective amount includes the amounts, such as may be expressed in weight percentages, of each component of the compositions of the instant invention which form azeotropic or azeotrope-like compositions at pressures other than the pressure described herein.

By "azeotropic or azeotrope-like" composition is meant a constant boiling, or substantially constant boiling, liquid admixture of two or more substances that behaves as a single substance. One way to characterize an azeotropic or azeotrope-like composition is that the vapor produced by partial evaporation or distillation of the liquid has substantially the same composition as the liquid from which it was evaporated or distilled, that is, the admixture distills/refluxes without substantial composition change. Constant boiling or substantially constant boiling compositions, which are characterized as azeotropic or azeotrope-like, exhibit either a maximum or minimum boiling point, as compared with that of the nonazeotropic mixtures of the same components.

For the purposes of this discussion, azeotropic or constant-boiling is intended to mean also essentially azeotropic or essentially-constant boiling. In other words, included within the meaning of these terms are not only the true azeotropes described above, but also other compositions containing the same components in different proportions, which are true azeotropes at other temperatures and pressures, as well as those equivalent compositions which are part of the same azeotropic system and are azeotrope-like in their properties. As is well recognized in this art, there is a range of compositions which contain the same components as the azeotrope, which will not only exhibit essentially equivalent properties for refrigeration and other applications, but which will also exhibit essentially equivalent properties to the true azeotropic composition in terms of constant boiling characteristics or tendency not to segregate or fractionate on boiling.

It is recognized in the art that a composition is azeotrope-like if, after 50 weight percent of the composition is removed such as by evaporation or boiling off, the difference in vapor pressure between the original composition and the composition remaining after 50 weight percent of the original composition has been removed is less than about 10 percent, when measured in absolute units. By absolute units, it is meant measurements of pressure and, for example, psia, atmospheres, bars, torr, dynes per square centimeter, millimeters of mercury, inches of water and other equivalent terms well known in the art. If an azeotrope is present, there is no difference in vapor pressure between the original composition and the composition remaining after 50 weight percent of the original composition has been removed.

It is possible to characterize, in effect, a constant boiling admixture which may appear under many guises, depending upon the conditions chosen, by any of the following criteria:

(a) The composition can be defined as an azeotrope of A, B, C (and D . . . ) since the very term "azeotrope" is at once both definitive and limitative, and requires that effective amounts of A, B, C (and D . . . ) for this unique composition of matter which is a constant boiling composition, (b) It is well known by those skilled in the art, that, at different pressures, the composition of a given azeotrope will vary at least to some degree, and changes in pressure will also change, at least to some degree, the boiling point temperature. Thus, an azeotrope of A, B, C (and D . . .) represents a unique type of relationship but with a variable composition which depends on temperature and/or pressure. Therefore, compositional ranges, rather than fixed compositions, are often used to define azeotropes, (c) The composition can be defined as a particular weight percent relationship or mole percent relationship of A, B, C (and D . . .), while recognizing that such specific values point out only one particular relationship and that in actuality, a series of such relationships, represented by A, B, C (and D . . .) actually exist for a given azeotrope, varied by the influence of pressure, or (d) An azeotrope of A, B, C (and D . . .) can be characterized by defining the compositions as an azeotrope characterized by a boiling point at a given pressure, thus giving identifying characteristics without unduly limiting the scope of the invention by a specific numerical composition, which is limited by and is only as accurate as the analytical equipment available.

The following quaternary and ternary compositions are characterized as azeotropic or azeotrope-like in that mixtures within this range exhibit a substantially constant boiling point at substantially atmospheric pressure. Being substantially constant boiling, the mixtures do not tend to fractionate to any great extent upon evaporation. After evaporation, only a small difference exists between the composition of the vapor and the composition of the initial liquid phase. This difference is such that the compositions of the vapor and liquid phases are considered substantially identical. Accordingly, any compositions within this range exhibit properties which are characteristic of a true quaternary and ternary azeotrope.

1. About 40 to 70 weight percent HFC-43-10mee, about 15 to 50 weight percent trans-1,2-DCE, about 1 to 25 weight percent cyclopentane and about 1 to 10 weight percent methanol; and preferably about 45 to 65 weight percent EFC-43-10-mee, about 20 to 30 weight percent trans-1,2-DCE, about 10 to 20 weight percent cyclopentane and about 2 to 8 weight percent methanol; and
2. About 35 to 75 weight percent HFC-43-10mee, about 10 to 50 weight percent trans-1,2-DCE and about 5 to 25 weight percent cyclopentane; and preferably about 40 to 70 weight percent HFC-43-10mee, about 15 to 45 weight percent trans-1,2-DCE and about 10–20 weight percent cyclopentane.

The following quaternary and ternary compositions have been established, within the accuracy of the fractional distillation method, as true quaternary and ternary azeotropes at substantially atmospheric pressure.

1. About 57.7 weight percent HFC-43-10mee, about 22.1 weight percent trans-1,2-DCE, about 16.0 weight percent cyclopentane and about 4.2 weight percent methanol; and
2. About 62.9 weight percent HFC43-10mee, about 19.9 weight percent trans-1,2-DCE and about 17.2 weight percent cyclopentane.

The aforestated azeotropes have nearly zero ozone-depletion potentials.

The azeotropic or azeotrope-like compositions of the instant invention permit easy recovery and reuse of the solvent from vapor defluxing and degreasing operations because of their azeotropic natures. As an example, the azeotropic mixtures of this invention can be used in cleaning processes such as described in U.S. Pat. No. 3,881,949, or as a buffing abrasive detergent.

In addition, the mixtures are useful as resist developers, where chlorine-type developers would be used, and as resist stripping agents with the addition of appropriate halocarbons.

Another aspect of the invention is a refrigeration method which comprises condensing a refrigerant composition of the invention and thereafter evaporating it in the vicinity of a body to be cooled. Similarly, still another aspect of the invention is a method for heating which comprises condensing the invention refrigerant in the vicinity of a body to be heated and thereafter evaporating the refrigerant.

A further aspect of the invention includes aerosol compositions comprising an active agent and a propellant, wherein the propellant is an azeotropic mixture of the invention; and the production of these compositions by combining said ingredients. The invention further comprises cleaning solvent compositions comprising the azeotropic mixtures of the invention.

The azeotropic or azeotrope-like compositions of the instant invention can be prepared by any convenient method including mixing or combining the desired component amounts. A preferred method is to weigh the desired component amounts and thereafter combine them in an appropriate container.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth in degrees Celsius and unless otherwise indicated, all parts and percentages are by weight.

EXAMPLE 1

A solution containing 59.0 weight percent HFC-43-10mee, 20.0 weight percent trans-1,2-DCE, 15.0 weight percent cyclopentane and 6.0 weight percent methanol was prepared in a suitable container and mixed thoroughly.

The solution was distilled in a five plate Oldershaw distillation column using a 5:1 reflux to take-off ratio. Head and pot temperatures were read directly to 1° C. The pressure was at 758.75 mmHg. Distillate compositions were determined by gas chromatography. Results obtained are summarized in Table 1.

TABLE 1

| Cuts | Temp. °C. Head | Wt. % Distilled or Recovered | Weight Percentages | | | |
|------|------|------|------|------|------|------|
| | | | HFC43-10mee | trans-1,2-DCE | Cyclopentane | Methanol |
| PRE | 33 | 9.5 | 60.0 | 17.7 | 18.1 | 4.2 |
| 1 | 33 | 18.9 | 59.4 | 18.4 | 18.0 | 4.2 |
| 2 | 34 | 28.5 | 58.7 | 19.4 | 17.7 | 4.2 |
| 3 | 34 | 38.0 | 58.0 | 20.6 | 17.2 | 4.2 |
| 4 | 34 | 47.7 | 57.3 | 22.1 | 16.3 | 4.3 |
| 5 | 34 | 57.6 | 56.5 | 24.4 | 14.8 | 4.3 |
| 6 | 34 | 67.1 | 56.0 | 27.5 | 12.2 | 4.3 |
| HEEL | — | 89.5 | 77.0 | 6.4 | 0.5 | 16.1 |

Analysis of the above data indicates very small differences between head temperatures and distillate compositions as the distillation progressed. A statistical analysis of the data indicates that the true quaternary azeotrope of HFC-43-10mee, trans-1,2-DCE, cyclopentane and methanol has the following characteristics at atmospheric pressure (99 percent confidence limits):
HFC-43-10mee=57.7±3.9
Trans-1,2-DCE=22.1±10.1
Cyclopentane=16.0±6.5
Methanol=4.2±0.2
Boiling Point, °C.=33.8±1.2

EXAMPLE 2

A solution containing 65.1 weight percent HFC-43-10mee, 20.0 weight percent trans-1,2-DCE and 14.9 weight percent cyclopentane was loaded into a two sump vapor degreaser. The solution was mixed thoroughly and boiled at about 34° C. for several hours at atmospheric pressure using a 10:1 reflux. Samples were taken and compositions determined by gas chromatography. Results are summarized in Table 2.

TABLE 2

| | Weight Percents | | |
|------|------|------|------|
| Hours | Cyclopentane | Trans-1,2-DCE | HFC-43-10mee |
| 0 | 14.9 | 20.0 | 65.1 |
| 1 | 17.4 | 19.7 | 62.9 |
| 2 | 17.4 | 19.5 | 63.1 |
| 3 | 17.3 | 20.0 | 62.7 |
| 4 | 16.9 | 20.4 | 62.7 |

Analysis of the above data indicates a very small change in the solution composition as boiling progressed. A statistical analysis of the data indicate that the true ternary azeotrope of HFC-43-10mee, trans-1,2-DCE and cyclopentane has the following characteristics at atmospheric pressure (99 percent confidence limits):

HFC-43-10mee 62.9±0.6
Trans-1,2-DCE =19.9±1.2
Cyclopentane=17.2±0.7

EXAMPLE 3

A vessel is charged with an initial composition at 25° C., and the vapor pressure of the composition is measured. The composition is allowed to leak from the vessel, while the temperature is held constant at 25° C., until 50 weight percent of the initial composition is removed, at which time the vapor pressure of the composition remaining in the vessel is measured. The results are summarized below.

| Refrigerant Composition | 0 wt % evaporated psia (kpa) | | 50 wt % evaporated psia (kPa) | | 0% change in vapor pressure |
|---|---|---|---|---|---|
| HFC-43-10mee/trans-1,2-DCE/cyclopentane | | | | | |
| 58.9/25.9/11.3/3.9 | 10.31 | 71.1 | 10.31 | 71.1 | 0.0 |
| 70/15/10/5 | 10.23 | 70.5 | 10.03 | 69.2 | 2.0 |
| 40/50/5/5 | 10.15 | 70.0 | 9.71 | 66.9 | 4.3 |
| 50/24/25/1 | 10.02 | 69.1 | 9.09 | 62.7 | 9.3 |
| 60/29/1/10 | 10.12 | 69.8 | 9.80 | 67.6 | 3.2 |
| 64/20/10/6 | 10.28 | 70.9 | 10.19 | 70.3 | 0.9 |
| 62/20/12/6 | 10.28 | 70.9 | 10.23 | 70.5 | 0.5 |
| 59/20/15/6 | 10.28 | 70.9 | 10.26 | 70.7 | 0.2 |
| 55/25/14/6 | 10.29 | 70.9 | 10.27 | 70.8 | 0.2 |
| 35/50/10/5 | 10.13 | 69.8 | 9.41 | 64.9 | 7.1 |
| 51/40/4/5 | 10.23 | 70.5 | 10.16 | 70.1 | 0.7 |
| 51/41/3/5 | 10.22 | 70.5 | 10.14 | 69.9 | 0.8 |
| HFC-43-10mee/trans-1,2-DCE/cyclopentane | | | | | |
| 59.8/30.9/9.3 | 9.14 | 63.0 | 9.14 | 63.0 | 0.0 |
| 35/50/15 | 9.01 | 62.1 | 8.15 | 56.2 | 9.5 |
| 75/10/15 | 8.92 | 61.5 | 8.65 | 59.6 | 8.2 |
| 75/20/5 | 9.07 | 62.5 | 8.86 | 61.1 | 2.3 |
| 65/20/15 | 9.09 | 62.7 | 9.06 | 62.5 | 0.3 |
| 46/40/14 | 9.10 | 62.7 | 8.97 | 61.8 | 1.4 |
| 75/24/1 | 9.03 | 62.3 | 8.87 | 61.2 | 1.8 |
| 50/44/6 | 9.10 | 62.7 | 9.03 | 62.3 | 0.8 |
| 50/42/8 | 9.11 | 62.8 | 8.87 | 61.2 | 2.6 |
| 65/10/25 | 8.90 | 61.4 | 8.86 | 61.1 | 1.8 |

The results of this Example show that these compositions are azeotropic or azeotrope-like because when 50 wt. % of an original composition is removed, the vapor pressure of the remaining composition is within about 10% of the vapor pressure of the original composition, at a temperature of 25° C. The results also show that the composition of the azeotrope points vary as the temperature is changed.

EXAMPLE 4

A suitable container was filled with the mixture shown in Table 3 and heated to the boiling point. Stainless steel nuts and bolts coated with various residues were suspended in the container for 10 seconds, then removed and observed. Results in Table 3 show most residues are completely removed.

TABLE 3

CLEANING PERFORMANCE

| Wt. Percents | MIL-H-5606G Hydraulic Oil | Houghton Draw | Tapmatic Cutting Fluid | Dow 200 Silicone Oil |
|---|---|---|---|---|
| HFC-43-10mee/ Trans-1,2-DCE/ Cyclopentane/ Methanol/ 59/20/15/6 | Residue 100% Removed | Residue 60% Removed | Residue 100% Removed | Residue 100% Removed |

EXAMPLES 5

A suitable container was filled with solvent compositions shown in Table 4 and mixed thoroughly at room temperature. Oil was then slowly added to each container until the solvent blend would no longer dissolve the oil. The oil used was Mil-H5606G Hydraulic Fluid. Results in Table 4 show the oil is soluble in each mixture.

TABLE 4

OIL SOLUBILITY

| Weight Percents | Solubility |
|---|---|
| HFC-43-10mee/Trans-1,2-DCE/Cyclopentane/Methanol | |
| 64/20/10/6 | 1% |
| 62/20/12/6 | 13% |
| 59/20/15/6 | 15% |

EXAMPLE 6

Wax was applied to a suitable metal part then submerged into a boiling solvent composition with ultrasonics. Solvent compositions are shown in Table 5. Two different consistencies of wax were used. Results in Table 5 show in each case the wax was almost completely removed.

TABLE 5

WAX REMOVAL

| | % Wax Removal | |
|---|---|---|
| Weight Percents | Consistency 1 | Consistency 2 |
| HFC-43-10mee/ Trans-1,2-DCE/Cyclopentane | | |
| 75/10/15 | 90% | 90% |
| 65/20/15 | 98% | 98% |

EXAMPLE 7

An epoxy-glass rigid printed wiring board (PWB) with mounted components such as multilayer ceramics (MLC), heat-sinks, ICs and resistors measuring 4 in×6 in was fluxed with Kester 135 RMA solder paste and wave soldered. A Corpane vapor degreaser was filled with 54.5 weight percent HFC-43-10mee, 25.0 weight percent trans-1,2-DCE, 14.0 weight percent cyclopentane, 6.0 weight percent methanol and 0.5 weight percent nitromethane in the boil sump and the rinse sump and allowed to come to operating conditions. The PWB was cleaned in the vapor degreaser using a cleaning cycle as follows:

1. 2 minute immersion in vapor space over boil sump 2. 2 minute immersion in liquid in rinse sump 3. 2 minute dryout in vapor space over rinse sump The boards were visually inspected and found to have no flux residue. Then the boards were tested for ionic residue using an Omega meter and found to have about 8–9 microgram/square inch of ionic residue on the surface, well below the acceptance standard of 15 microgram/square inch.

EXAMPLE 8

A rigid epoxy-glass printed wiring board was fluxed with Kester 186-35 rosin flux, which was a high (35%) rosin content flux. The boards were preheated to 225° F. followed by wave solder for 3 seconds at 500° F. The boards were then cleaned with 54.5 weight percent hFC-43-10mee, 25.0 weight percent trans-1,2-DCE, 14.0 weight percent cyclopentane, 6.0 weight percent methanol and 0.5 weight percent nitromethane using a Branson 250 vapor degreaser using two different cycles as follows:

Vapor cycle 30 seconds in vapor over boil sump 30 second spray over boil sump and hold 30 seconds to dry 30 seconds in vapor over boil sump 30 second spray over boil sump and hold 30 seconds to dry Liquid Cycle 30 seconds in vapor over boil sump 1.5 minutes in liquid in boil sump 30 second spray over boil sump 1 minute in liquid in rinse sump Both cycles were carried out at the same time using 3 boards each. Visual inspection at 5 times magnification showed no flux residue or white residue. Ionic contamination level was measured using an Omegameter. Results showed the liquid cycle had ionic level of 6.9 microgram/sq in and vapor cycle had an ionic level of 4.8 microgram/sq in, well below an acceptance standard of 15 microgram/sq in.

EXAMPLE 9

A set of elctromechanical relays were cleaned in Baron Blakeslee vapor degreaser, to remove contaminations such as dust particles, light oils and minor flux residue from downstream processing. The relays were cleaned with 54.5 weight percent HFC-43-10mee, 25.0 weight percent trans-1,2-DCE, 14.0 weight percent cyclopentane, 6.0 weight percent methanol and 0.5 weight percent inerting agent as follows:

1 minute in vapor space over boil sump 3 minute immersion in rinse sump liquid with ultrasonics 1 minute spray over boil sump 2 minute drying over boil sump vapor space 2 minute additional drying outside of vapor space (near condensing coil)

The relays were tested for electrical continuity in a continuity tester and a 100% acceptance level was achieved.

EXAMPLE 10

Ball bearings were coated with Houghton Rust Veto 76-MB, an oil used for rust prevention. Bearings were cleaned in a Corpane vapor degreaser containing 46.0 weight percent HFC-43-10mee, 40.0 weight percent trans-1,2-DCE and 14.0 weight percent cyclopentane. The following cycle was used:

2 minute immersion in boil sump 2 minute immersion in rinse sump 1 minute immersion in vapor space The ball bearings were inspected under microscope at 5OX magnification for waxy residue and were found to be clean.

EXAMPLE 11

Ball bearings coated with Winso Rust Preventative 1161-X were cleaned in a Corpane vapor degreaser containing 46.0 weight percent HFC-43-10mee, 40.0 weight percent trans-1,2-DCE and 14.0 weight percent cyclopentane. The following cycle was used:

2 minute immersion in boil sump 2 minute immersion in rinse sump 1 minute immersion in vapor space About 100 ball bearings were cleaned and evaluated using RGA (gravimetric analysis) where parts are heated from room temperature to 450° C. and then analysis of residue left behind is done by GC-MS. The parts looked clean and passed acceptance test.

EXAMPLE 12

Formed metal lead-frames contaminated with Lard Kut 206, a stamping oil, were cleaned in a Branson vapor degreaser containing 46.0 weight percent HFC-43-10mee, 40.0 weight percent trans-1,2-DCE and 14.0 weight percent cyclopentane. The following cycle was used:

2 minute immersion in boil sump 2 minute immersion in rinse sump 2 minute in vapor space over rinse sump The lead frames were analyzed by IR and found to have no contamination. Visual inspection under 10X microscope showed no residue or spots.

ADDITIONAL COMPOUNDS

Other components, such as aliphatic hydrocarbons having a boiling point of 35°–85° C., hydrofluorocarbonalkanes having a boiling point of 35°–85° C., hydrofluoropropanes having a boiling point of between 35°–85° C., hydrocarbon esters having a boiling point between 30°–80° C., hydrochlorofluorocarbons having a boiling point between 25°–85° C., hydrofluorocarbons having a boiling point of 25°– 85° C., hydrochlorocarbons having a boiling point between 35°–85° C., chlorocarbons and perfluorinated compounds, can be added to the azeotropic or azeotrope-like compositions described above without substantially changing the properties thereof, including the constant boiling behavior, of the compositions. Examples of such components, which typically do not exceed about 10 weight percent of the total composition, include the following:

| COMPOUND | FORMULA | boiling point °C. |
|---|---|---|
| HCFC-123 | $CHCl_2CF_3$ | 27 |
| HCFC-141b | $CFCl_2CH_3$ | 32 |
| HCFC-225aa | $CHF_2CCl_2CF_3$ | 53 |
| HCFC-225ca | $CHCl_2CF_2CF_3$ | 52 |
| HCFC-225cb | $CHClFCF_2CF_2Cl$ | 56 |
| HCFC-225da | $CClF_2CHClCF_3$ | 50 |
| HFC-HFC-43-10mf | $CF_3CH_2CF_2CF_2CF_3$ | 52 |
| HFC-HFC-43-10mcf | $CF_3CF_2CH_2CF_2CF_3$ | 52 |
| FC-C-51-12 | cyclo-$C_4F_6(CF_3)_2$ | 45 |
|  | $CH_3OCF_2CHFCF_3$ | 52 |

-continued

| COMPOUND | FORMULA | boiling point °C. |
|---|---|---|
| HFC-C-456myc | cyclo-$CH_2CH_2CF_2CF(CF_3)$ | |
| HFC-C-354 | cyclo-$CF_2CF_2CH_2CH_2$ | 50 |
| | $C_4F_9CH=CH_2$ | 58 |
| MEK | $CH_3C(O)C_2H_5$ | 80 |
| THF | cyclo-$OC_4H_8$ | 66 |
| methyl formate | $HC(O)OCH_3$ | 32 |
| ethyl formate | $HC(O)OC_2H_5$ | 54 |
| methyl acetate | $CH_3C(O)OCH_3$ | 56 |
| ethyl acetate | $CH_3C(O)OC_2H_5$ | 77 |
| acetone | | 56 |
| 1,2-dichloroethane | | 84 |
| acetonitrile | | 82 |
| methylene chloride | | 40 |

Additives such as lubricants, corrosion inhibitors, stabilizers, surfactants, dyes and other appropriate materials may be added to the novel compositions of the invention for a variety of purposes provided they do not have an adverse influence on the composition, for their intended applications. Examples of stabilizers include nitromethane and nitroethane.

What is claimed is:

1. A composition comprising effective amounts of 1,1,1,2,3,4,4,5,5,5-decafluoropentane, trans-1,2-dichloroethylene, cyclopentane and methanol or 1,1,1,2,3,4,4,5,5,5-decafluoropentane, trans-1,2-dichloroethylene and cyclopentane to form an azeotropic or azeotrope-like composition at substantially atmospheric pressure.

2. The composition of claim 1, consisting essentially of 40–70 weight percent 1,1,1,2,3,4,4,5,5,5-decafluoropentane, 15 to 50 weight percent trans-1,2-dichloroethylene, 1 to 25 weight percent cyclopentane and 1 to 10 weight percent methanol; 35–75 weight percent 1,1,1,2,3,4,4,5,5,5-decafluoropentane, 10–50 weight percent trans-1,2-dichloroethylene and 5 to 25 weight percent cyclopentane.

3. The composition of claim 1, consisting essentially of 45 to 65 weight percent 1,1,1,2,3,4,4,5,5,5-decafluoropentane, 20 to 30 weight percent trans-1,2-dichloroethylene, 10 to 20 weight percent cyclopentane and 2 to 8 weight percent methanol; 40 to 70 weight percent 1,1,1,2,3,4,4,5,5,5-decafluoropentane, 15 to 45 weight percent trans-1,2-dichloroethylene and 10 to 20 weight percent cyclopentane.

4. The composition of claim 1, consisting essentially of 57.7 weight percent 1,1,1,2,3,4,4,5,5,5-decafluoropentane, 22.1 weight percent trans-1,2-dichloroethylene, 16.0 weight percent cyclopentane and 4.2 weight percent methanol; 62.9 weight percent 1,1,1,2,3,4,4,5,5,5-decafluoropentane, 19.9 weight percent trans-1,2-dichloroethylene and 17.2 weight percent cyclopentane.

* * * * *